(12) United States Patent
Hanamoto

(10) Patent No.: US 7,304,927 B2
(45) Date of Patent: Dec. 4, 2007

(54) ENHANCED TESTING REGION ACCESS FOR OPTICAL DISKS

(75) Inventor: Yasushi Hanamoto, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 695 days.

(21) Appl. No.: 10/834,244

(22) Filed: Apr. 29, 2004

(65) Prior Publication Data
US 2004/0223432 A1 Nov. 11, 2004

(30) Foreign Application Priority Data
May 6, 2003 (JP) ............................. 2003-128427

(51) Int. Cl.
G11B 7/007 (2006.01)
(52) U.S. Cl. ................. 369/47.53; 369/47.19
(58) Field of Classification Search ............. 369/53.18, 369/47.53, 47.19
See application file for complete search history.

(56) References Cited
U.S. PATENT DOCUMENTS
5,305,296 A * 4/1994 Kono ...................... 369/47.53
6,275,462 B1 * 8/2001 Masaki et al. .............. 369/116

FOREIGN PATENT DOCUMENTS
JP 2002-056617 2/2002

* cited by examiner

Primary Examiner—Gautam R. Patel
(74) Attorney, Agent, or Firm—Fish & Richardson P.C.

(57) ABSTRACT

An optical disk apparatus is disclosed which makes accesses on a block-by-block basis to an optical disk having a recording track segmented into first recording areas by first address information correlated with wobbling information of the recording track, the block being a unit for error correction consisting of a plurality of the first recording areas. The optical disk apparatus comprises an access control unit which, when an access is made to a second recording area consisting of a plurality of the first recording areas, provides access control in sequence without applying any data modulation and/or demodulation process to each of the plurality of first recording areas constituting the second recording area.

13 Claims, 6 Drawing Sheets

ENHANCED TESTING REGION ACCESS FOR OPTICAL DISKS

CROSS-REFERENCE TO RELATED APPLICATIONS

The present application claims priority upon Japanese Patent Application No. 2003-128427 filed on May 6, 2003, which is herein incorporated by reference.

BACKGROUND OF THE INVENTION

1. Field of the Invention

The present invention relates to an optical disk apparatus ensuring effective use of the recording area of an optical disk, and to a method for controlling the optical disk apparatus.

2. Description of the Related Art

One of the typical standards of optical disks capable of recording/reading out information utilizing a laser beam is a CD (Compact Disk) standard for the data-recordable (Write Once) CD-R, the re-recordable (ReWritable) CD-RW etc. In recent years, the CD-R disks and the CD-RW disks have been increasingly used accompanied by lowering of their prices and they have prevailed widely.

For an optical disk (a CD-standard medium) conforming with the physical format of the standard of a CD capable of recording/reading out, a pre-groove (guiding groove) wobbles (is winding) along a waveform FM-modulated by absolute time information etc. An ATIP (Absolute Time In Pre-groove) address being the absolute time information can be acquired by demodulating the frequency of the wobbling from this pre-groove. The ATIP address is utilized as management information for managing the recording/reading out position of data on the CD-standard medium in an optical disk apparatus executing recording/reading out of data in conformity with the logical format of the CD standard.

By the way, the storage capacity of a CD-R or a CD-RW disk is around 650 M bytes or 700 M bytes for a standard one. In recent years, a need for a larger capacity has been raised to optical disk media for the use for recording video image etc. Therefore, the standard recording capacity of the CD-R or the CD-RW can not cope with such a need.

Thus, for the optical disk apparatuses, a mechanism has been proposed, in which an ATIP address obtained from an existing CD-standard medium such as a CD-R or a CD-RW is converted into an address for high-density recording. The high-density recording to the CD-standard medium is realized utilizing the address for high-density recording. See, for example, Japanese Patent Application Laid-open Publication. No. 2002-56617. The address for high-density recording is an address given to each of segments in the case where a recording area (hereinafter, referred to as "one (1) ATIP section") corresponding to one (1) ordinary sector segmented by an ATIP address is logically segmented into a predetermined number (the multiplying factor of recording density) of segments.

Furthermore, for an optical disk apparatus equipped with the mechanism described above (hereinafter, referred to as "conventional optical apparatus"), in the case where high-density recording is carried out to the CD-standard medium, a technique has been proposed, in which the logical format of a DVD (Digital Versatile Disk) standard such as a DVD-R or a DVD-RW is utilized. In the logical format of the DVD standard, it is provided that error correction is executed using Reed Solomon Code. Therefore, a conventional optical disk apparatus is equipped with a mechanism for encoding (modulation) processing for constituting one (1) ECC (Error Correction Code) block corresponding to 16 sectors by adding the Reed Solomon Code to recorded data, and a mechanism for decoding (demodulation) processing for decoding the above-mentioned one (1) ECC block read out from the CD-standard medium.

As described above, in the case of a high-density recording mode, i.e., where a logical format of the DVD standard is employed for the CD-standard medium, recording/reading out in one (1) ECC block as a unit, which is a unit for executing the error correction is employed as a principle.

By the way, in a CD-standard medium, a PCA (Power Calibration Area) is set for executing recording and reading-out of a predetermined testing signal for adjusting the recording power of the laser output emitted from an optical head. The size of the area of the PCA is defined to be 100 sectors (100 ATIP sections).

Here, in the case where a testing signal is recorded in units of ECC block to a PCA on a recordable CD-R disk, the PCA is used up by around 12 accesses. Then, data can not be recorded any more to the CD-R disk after the PCA is used up even when there is an empty area in the program area available to a user.

As described above, a conventional optical disk apparatus causes a problem that the recording area having a predetermined size set on a CD-standard medium is used up by making accesses in units of ECC blocks in a high-density recording mode even when the number of accesses made is small and, therefore, the effective use of the disk can not be facilitated.

SUMMARY OF THE INVENTION

The present invention was conceived in order to solve the above and other problems and its object is to provide an optical disk apparatus capable of facilitating effective use of the recording area of an optical disk, and a method for controlling the apparatus.

In order to achieve the above and other objects, according to a first aspect of the present invention there is provided an optical disk apparatus making accesses on a block-by-block basis to an optical disk having a recording track segmented into first recording areas by first address information correlated with wobbling information of the recording track, the block being a unit for error correction which consists of a plurality of the first recording areas, the optical disk apparatus comprising an access control unit which, when an access is made to a second recording area consisting of a plurality of the first recording areas, provides access control in sequence without applying any data modulation and/or demodulation process to each of the plurality of first recording areas constituting the second recording area.

In this manner, the optical disk apparatus according to the aspect of the invention making accesses to an optical disk in units of the block described above executes access control one by one to each of the first recording area (one (1) ATIP section described as follows) constituting the second recording area, not making accesses in units of the block as described above when an access is made to the second recording area having a predetermined size and set on the optical disk.

This is effective for the case where it is not necessary to make accesses in units of block to the second recording area to which the accesses are made, and for the case of an area for which it is not necessary to execute data processing for improving reliability of, e.g., error correction by Reed Solomon Code and EFM-Plus (8/16) modulation/demodulation. That is, it is possible to improve the frequency of accesses to the second recording area and to facilitate the effective use of the second recording area which is the limited resource.

According to a second aspect of the present invention, the access control unit may provide access control in sequence to each of segmented areas obtained by logically segmenting each of the plurality of first recording areas constituting the second recording area.

The optical disk apparatus according to the aspect of the invention can record to each of the segmented areas obtained by logically segmenting the first recording area in a high-density recording mode. Then, it is possible to further improve the frequency of accesses to the second recording area by executing the above-described access control to each of the segmented areas, and to facilitate the effective use of the second recording area being the limited resource.

According to a third aspect of the present invention, the second recording area may be a testing area to in which recording and reading out of predetermined testing signals is carried out to adjust the power of a laser beam emitted from an optical head, and the access control unit may provide access control for recording and reading out the testing signals in sequence to each of the plurality of first recording areas constituting the testing area.

In this manner, the optical disk apparatus according to the aspect of the invention does not make accesses in units of block as described above conventionally to the testing area of a PCA used in the OPC, however, it executes above-described access control to each of the first recording areas constituting the testing area.

This results in improving the frequency of accesses to the testing area of the PCA compared with the accesses in units of block and effective use of the testing area can be facilitated. Furthermore, since the frequency of accesses to the testing area of the PCA is improved, the number of times of data recording and re-recording to the program area (user area) is increased. Therefore, effective use of the program area can be facilitated by the amount of the increase.

According to a fourth aspect of the present invention, the second recording area may be a testing area in which recording and reading out of predetermined testing signals are carried out to adjust the power of a laser beam emitted from an optical head, and the access control unit may provide access control for recording and reading out the testing signals in sequence to each of the segmented areas obtained by logically segmenting each of the plurality of first recording areas constituting the testing area.

The optical disk apparatus according to the aspect of the invention can record to each of the segmented areas obtained by logically segmenting the first recording area in the high-density recording mode. Then, the above-described access control is executed to each of the segmented areas being logically segmented for the above-described testing area of the PCA.

This results in improving further the frequency of accesses to the testing area of the PCA and effective use of the testing area can be facilitated. Furthermore, since the frequency of accesses to the testing area of the PCA is improved, the number of times of data recording and re-recording to the program area is increased. Therefore, effective use of the program area can be facilitated by the amount of the increase.

In order to attain the above object, according to a fifth aspect of the present invention there is provided a method of controlling an optical disk apparatus making accesses on a block-by-block basis to an optical disk having a recording track segmented into first recording areas to each of which first address information is imparted, the block being a unit for error correction which consists of a plurality of the first recording areas, the method comprising when an access is made to a second recording area consisting of a plurality of the first recording areas, providing access control in sequence without applying any data modulation and/or demodulation process to each of the plurality of first recording areas constituting the second recording area.

Thus, in the above-described control method of the optical disk apparatus according to the invention, in which accesses are made to the optical disk in units of block, in the case where an access is made to the second recording area having a predetermined size set on the optical disk, the access is not made in the above-described units of block but access control is executed one by one to each of the first recording areas (one (1) ATIP section) constituting the second recording area.

This is effective for the area for which it is not necessary to make an access in units of block to the second recording area to which the access has been made, and for which it is not necessary to execute data processing for improving reliability such as error correction by Reed Solomon Code and FM-Plus (8/16) modulation/demodulation. That is, it is possible to improve the frequency of accesses to the second recording area and to facilitate the effective use of the second recording area being the limited resource.

According to a sixth aspect of the invention, there is provided a computer-readable medium containing a computer software program for causing an optical disk apparatus to execute the control method according to the fifth aspect of the invention.

Features and objects of the present invention other than the above will become clear by reading the description of the present specification with reference to the accompanying drawings.

BRIEF DESCRIPTION OF THE DRAWINGS

The above and other objects, aspects, features and advantages of the present invention will become more apparent from the following detailed description when taken in conjunction with the accompanying drawings, in which.

DETAILED DESCRIPTION OF THE INVENTION

Embodiment of the present invention will now be described in detail based on the drawings.

System Configuration

Figure 1:
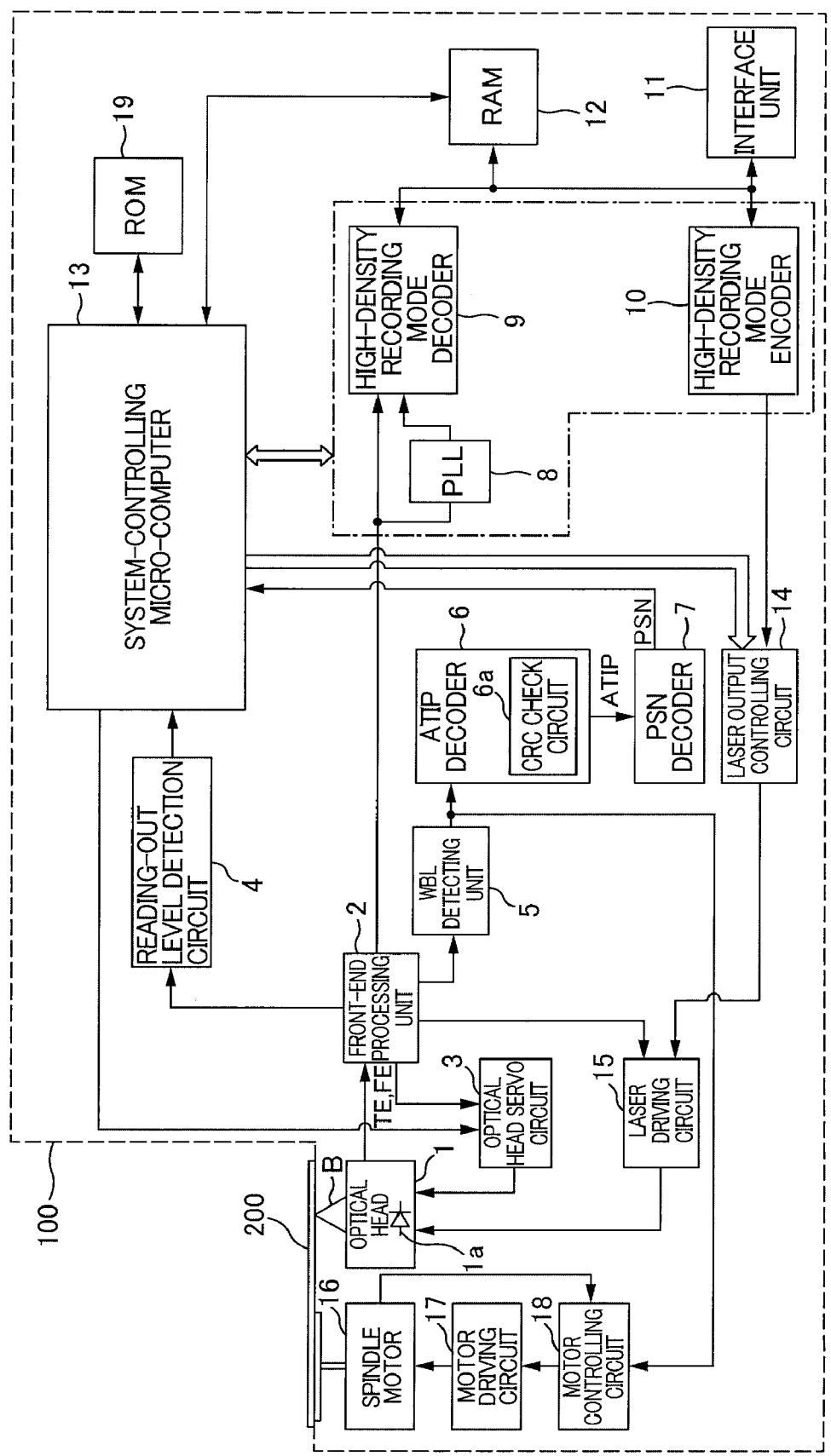
FIG. 1 shows a schematic composition of a system including an optical disk apparatus according to an embodiment of the invention.

First, the schematic configuration of a system including an optical disk apparatus 100 being an embodiment of the invention will be described referring to FIG. 1. The optical disk apparatus 100 shown in FIG. 1 is an optical disk recording/reading-out apparatus capable of recording and reading out utilizing an address for a high-density recording, for an optical disk (CD-standard medium) 200 conforming to a physical format of an existing CD standard such as a CD-R and CD-RW. Otherwise, the optical disk apparatus 100 may be an optical disk reading-out apparatus dedicated to reading-out utilizing an address for high-density recording. The physical format is a format providing the dimensions, the recording/reading-out method and the sector composition etc. of the optical disk 200.

Here, considering the convenience of users, it is preferable to support recording and reading out in the standard recording mode conforming with the logical format of the CD standard, for the CD-standard medium. Furthermore, the optical disk apparatus 100 may support recording and reading out in the standard recording mode conforming with the logical format of a DVD (Digital Versatile Disk) standard for the optical disk 200 (DVD-standard medium) conforming with the physical format of the DVD standard such as a DVD-R and DVD-RW. The logical format provides the mechanism of a data structure such as files, directories and volumes.

Now, for the convenience of description, it is assumed that the optical disk 200 is a CD-standard medium and the optical disk apparatus 100 supports only recording and reading out in the high-density recording mode using an address for the high-density recording. In a CD-standard medium, a pre-groove (guiding groove) forming a recording track wobbles (winding) along the waveform FM-modulated by absolute time information. ATIP (Absolute Time In Pre-groove) address ("first address information") being the absolute time information can be obtained by demodulating the frequency of wobbling from this pre-groove.

As shown in the figure, the optical disk apparatus 100 comprises an optical head 1, a front-end processing unit 2, an optical head servo circuit 3, a reading-out level detection circuit 4, a WBL detecting unit 5, an ATIP decoder 6, a PSN (Physical Sector Number) decoder 7, a PLL circuit 8, a high-density recording mode decoder 9, a high-density recording mode encoder 10, an interface unit 11, an RAM 12, a system-controlling microcomputer 13, a laser output controlling circuit 14, a laser drive circuit 15, a spindle motor 16, a motor drive circuit 17, a motor controlling circuit 18 and an ROM 19.

The optical head 1 is incorporated with an objective lens (not shown), a laser element 1*a* emitting a laser beam to the optical disk 200 through this objective lens, a light-receiving element (not shown) for receiving the reflected light from the optical disk 200, etc. Furthermore, the optical head 1 is incorporated with a sliding mechanism for moving the optical head 1 to the recording track to record/read out, a tracking mechanism for executing the control (tracking control) for causing the laser beam emitted to the optical disk 200 to follow a recording track to record/read out and a focus mechanism for executing control (focus control) to correct deviation from the focus position of the laser beam emitted to the optical disk 200 (all of them are not shown).

The front-end processing unit 2 is provided with an RF amplifier consisting of a matrix calculating circuit, an amplification circuit and a waveform shaping circuit (equalizer) etc., a tracking error signal generation circuit based on the three (3)-beam method, the push-pull method or DPD (Differential Phase Detection) method, a focus error signal generation circuit based on the astigmatism or the Foucault method etc. (all of them are not shown).

The RF amplifier generates an RF signal (radio frequency signal) for determining the presence or absence of bits present on the recording track to record/read out based on an electric signal generated as a function of the amount of received light at the light-receiving element (not shown) of the optical head 1. This RF signal is binarized. The RF signal contains wobbling frequency component to obtain an ATIP address. Furthermore, the RF signal also contains ID information described as follows when the optical disk 200 has been applied with high-density recording in advance.

Similarly to the above-described RF amplifier, the tracking error signal generation circuit generates a tracking error signal for servo-controlling the tracking control mechanism of the optical head 1 based on the electric signal generated as a function of the amount of the received light at the light-receiving element (not shown) of the optical head 1. The focus error signal generation circuit also generates a focus error signal for servo-controlling the focus controlling mechanism of the optical head 1 based on the electric signal of the above-described light-receiving element (not shown).

The optical head servo circuit 3 generates a servo control signal for driving a servo mechanism (such as a tracking servo mechanism and focus servo mechanism) incorporated in the optical head 1 based on various signals (such as the tracking error signal and the focus error signal) generated at the front-end processing unit 2. Then, the driving of the servo mechanisms is servo-controlled based on the servo-controlling signals.

The reading-out level detection circuit 4 is a circuit equipped for calculating an asymmetry value, "$\beta=(A1+A2)/(A1-A2)$" which the system-controlling microcomputer 13 uses for determining the optimal value of the OPC (Optimum Power Control). Here, in an OPC, after recording a testing signal to a PCA set on a recording track of the optical disk 200 at a predetermined velocity varying stepwise the recording power of the laser element 1*a*, the testing signal is read out from the PCA. Then, the asymmetry value $\beta$ calculated based on the reading-out level of the testing signal is compared with a target T$\beta$ (for example, 0.04) and the recording power of the laser element 1*a* of the time when the asymmetry value $\beta$ closest to the target T$\beta$ is obtained is set as the optimal recording power at the recording velocity.

Thus, the reading-out detection circuit 4 generally comprises a peak hold circuit, a bottom hold circuit etc. (all of them are not shown), receives an RF signal generated by the RF amplifier when the testing signal recorded on the PCA is read out and detects a peak level A1 and a bottom level A2 of the RF signal. These detected peak level A1 and bottom level A2 are sent to the system-controlling microcomputer 13.

The reading-out level detection circuit 4 may consist of, for example, a zero-cross comparator and an LPF (Low Pass Filter) circuit etc. (all of them are not shown). In this composition, when the testing signal recorded on the PCA is read out, an RF signal generated at the RF amplifier is received and the DC voltage level of the RF signal is detected through the zero-cross comparator and the LPF circuit. This detected DC voltage level is transmitted to the system-controlling microcomputer 13. In this case, the system-controlling microcomputer 13 compares the level of the DC voltage received from the LPF circuit with the level of the target DC voltage for the target T$\beta$.

In the following description, it is assumed that the reading-out level detection circuit 4 has a composition for detecting the peak level A1 and the bottom level A2.

A WBL detecting unit 5 is constituted by a BPF (Band Pass Filter) circuit and a comparator etc. The BPF circuit receives the RF signal generated at the front-end processing unit 2 and extracts a wobbling frequency component (having the central frequency of 22.05 kHz). The comparator generates a binarized WBL (Wobble) signal by the comparison of the above-described wobbling frequency component and a reference voltage and sends it to the ATIP decoder 6 and the motor controlling circuit 18.

The ATIP decoder 6 decodes an ATIP address based on the WBL signal for one (1) ATIP section received from the WBL detecting unit 5. Here, the WBL signal for one (1) ATIP section contains a pattern for detecting the synchronization, identifier given to the recording area where the WBL signal is recorded, wobbling information including the ATIP address etc., CRC data for detecting bit error etc. of the wobbling information, etc. (see FIG. 2).

The ATIP decoder 6 has a CRC check circuit 6a. The CRC check circuit 6a checks the CRC based on the above-described CRC data in order to determine whether the ATIP address is normally decoded or not from the WBL signal for one (1) ATIP section. The method for checking the result of the decoding the ATIP address is not limited to the CRC check scheme but, for example, the parity check scheme using parity bits and the ECC check scheme using an ECC (Error Correcting Code) may be employed.

When the optical disk 200 is in a non-recorded state, the PSN decoder 7 receives the ATIP address decoded at the ATIP decoder 6 and converts it into a PSN address as an address for high-density recording. On the other hand, when the optical disk 200 is in a high-density-recorded state, the PSN decoder 7 receives from the front-end processing unit 2 ID (Identification Data) information contained in the RF signal and converts it into a PSN address. The ID information is the information for the optical disk apparatus 100 to identify each of the segmented areas logically segmented by the PSN address on the recording track, and is recorded in the optical disk 200 together with the recording data and the parity bits (see FIG. 3).

The PLL circuit 8 comprises a phase comparator, a charge pump, an LPF, a VCO, a frequency divider, etc. In this composition, the PLL circuit 8 generates a clock signal to be used as a timing signal during a decoding process corresponding to the standard of the optical disk 200 based on the WBL signal received from the WBL detecting unit 5.

The high-density recording mode decoder 9 executes a decoding process supporting the logical format employed for a reading-out process to the optical disk 200 in the above-described high-density recording mode. In the invention, a decoding process supporting the logical format defined by the DVD standard is employed. In the logical format of the DVD standard, EFM-plus (8/16 modulation) is provided as the modulation code and the Reed Solomon Code is provided as the error correction code. Then, the high-density recording mode decoder 9 executes a decoding process based on the above-described modulation code and the error correction code, based on the clock signal generated at the PLL circuit 8 and the RF signal detected at the front-end processing unit 2.

The high-density recording mode encoder 10 executes an encoding process corresponding to the logical format employed for the recording process to the optical disk 200 in the above-described high-density recording mode for recording data inputted from an information processing apparatus (not shown) such as a personal computer through the interface unit 11. In the invention, because of the relationship with the high-density recording mode decoder 9, an encoding process corresponding to the logical format provided in the DVD standard is employed. As this encoding process, a process for constituting one (1) ECC block being the unit for error correction during recording/reading out, an EFM-plus modulation process or a scramble process can be listed, and a modulated signal for recording after being applied with these processes is transmitted to the laser output controlling circuit 14.

The interface unit 11 controls transmitting and receiving of data for recording/reading out between the optical disk apparatus 100 and an information processing apparatus (not shown) such as a personal computer.

When the RAM 12 has received a request for reading out from, the information processing apparatus (not shown) through the interface unit 11, the RAM 12 stores temporarily intermediate data under decoding and read-out data after decoding at the high-density recording mode decoder 9. This temporarily stored read-out data is transmitted to the information processing apparatus (not shown) through the interface unit 11.

Furthermore, when the RAM 12 has been inputted with recording data to be the subject of the request for recording from the information processing apparatus (not shown) through the interface unit 11, the RAM 12 stores temporarily the recording data. An access is made to this temporarily stored recording data when an encode process is executed at the high-density recording mode encoder 10.

The system-controlling microcomputer 13 manages the control of the system of the whole optical disk apparatus 100 relating to recording and reading out of the optical disk 200. For example, when the system-controlling microcomputer 13 has received a request for recording, containing a PSN address from the information processing apparatus (not shown), the system-controlling microcomputer 13 controls the high-density recording mode encoder 9 to start an encode process for the recording data in the recording area designated by the PSN address Similarly, when the system-controlling microcomputer 13 has received a request for reading out, containing a PSN address from the information processing apparatus (not shown), the system-controlling microcomputer 13 controls the high-density recording mode decoder 9 and the PLL circuit 8 to start a decoding process of the read-out data from the recording area designated by the PSN address.

Furthermore, as described above, the system-controlling microcomputer 13 receives the peak level A1 and the bottom level A2 from the reading-out level detection circuit 4 and calculates the asymmetry value $\beta$ according to the formula of "$(A1+A2)/(A1-A2)$". Here, the ROM 19 has stored the target $T\beta$ correlated with the recording velocity and identification information (manufacturer, disk type etc.) of the optical disk 200 and the system-controlling microcomputer 13 read out the target $T\beta$ correlated with the identification information of the optical disk 200 and the recording velocity during the test, from the ROM 19. Then, the system-controlling microcomputer 13 compares one by one the calculated asymmetry value $\beta$ with the target $T\beta$ as well as executes adjustment of the recording power of the laser element 1a through the laser output controlling circuit 14 and recording of a new testing signal to the PCA to perform the OPC that sets the recording power when the optimal asymmetry value $\beta$ is determined as the optimal recording power.

The laser output controlling circuit 14 generates a pulse signal for driving the laser element 1a for emission based on the recording modulation signal received from the high-density recording mode encoder 10, and transmits it to the laser driving circuit 15. Furthermore, the laser output controlling circuit 14 executes an OPC for setting the optimal recording power of the laser beam emitted from the laser element 1a under the control of the system-controlling microcomputer 13.

The laser driving circuit 15 drives the laser element 1a for emission during recording based on the pulse signal received from the laser output controlling circuit 14. Thereby, a laser beam is emitted from the laser element 1a and pits corresponding to a modulated signal for recording of the output of the high-density recording mode encoder 10 are formed on the recording track of the optical disk. On the other hand, during reading out, under the control of an APC (Automatic Power Control) circuit (not shown) equipped inside or outside of the front-end processing unit 2, laser driving circuit 15 drives the laser element 1a for emission. The optical head 1 comprises a detector (not shown) for detecting the power of the laser beam emitted from the laser element 1a. The APC circuit executes an APC for stabilization of the power of the laser beam emitted from the laser element 1a, observing the power of the laser beam detected by the detector.

The spindle motor 16 is a motor for driving the optical disk 200 to rotate. The motor driving circuit 17 is a circuit for driving the spindle motor 16. The motor controlling circuit 18 is a circuit for control driving of the spindle motor 16 according to a constant-linear-velocity scheme in the CD standard using the wobbling frequency information based on the WBL signal received from the WBL detecting unit 5. Otherwise, the rotation-driving control of the spindle motor 16 may be executed according to a constant-angular-velocity scheme using the pulse signal generated as a function of the rotation of the spindle motor 16.

The access control unit in claims 1 to 4 is operated mainly by the system-controlling microprocessor 13 and is constructed as a system comprising the optical head 1, the front-end processing unit 2, the reading-out level detection circuit 4, the laser output controlling circuit 14, the laser drive circuit 15, and the ROM 19. Furthermore, the function of "access control unit" is accomplished by a computer software program stored in the ROM 19 which is executed by the system-controlling microcomputer 13. Alternatively, the function of "access control unit" may be implemented by a logical circuit arranged for operating the function of "Access control unit" inside the system-controlling microcomputer 13.

Logical Format of the High-Density Recording Mode

Standard Recording Mode

Figure 2:
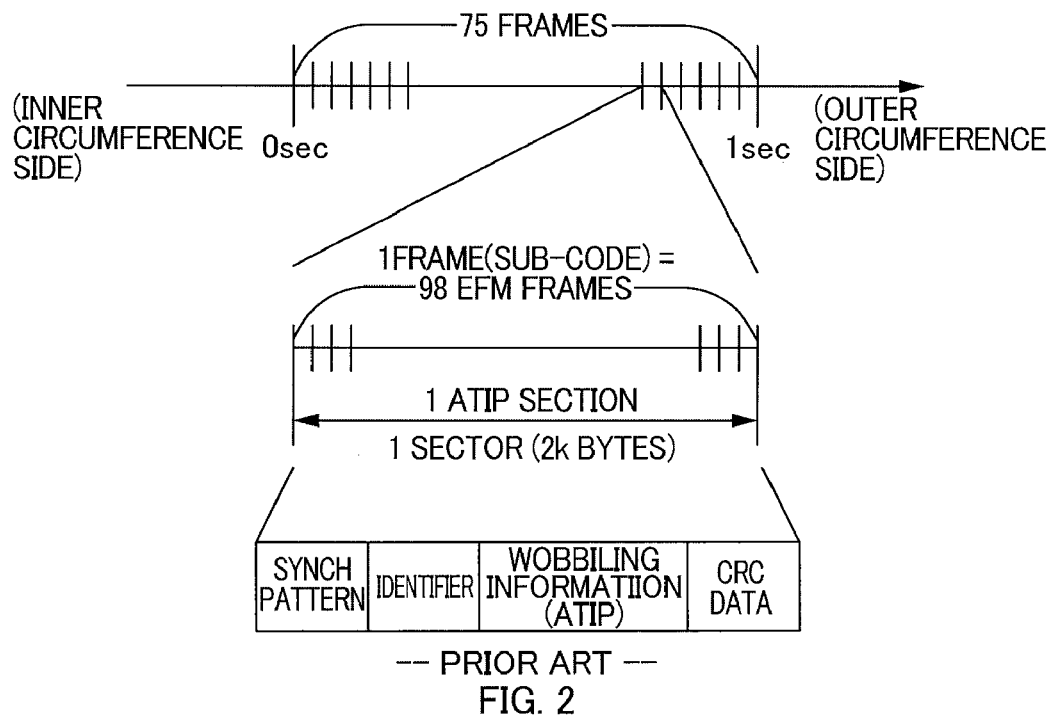
FIG. 2 illustrates a logical format employed for the case of the standard recording mode.

First, referring to FIG. 2, the logical format employed for the case of standard recording mode will be described. As shown in the figure, the minimal unit of recorded on the optical disk 200 is one (1) EFM frame based on the EFM (8/14 modulation) modulation scheme of the CD standard. Then, one (1) frame of 588 bits is composed by 98 EFM frames. Then, one (1) sub-coding frame (containing its track number, its index information, its absolute/relative address etc.) consisting of "P, Q, R, . . . , W" is generated by this one (1) frame.

Absolute addresses correlated with the wobbling information of the recording track are given to the recording track from the inner circumference toward the outer circumference on the optical disk 200. This absolute address corresponds to the ATIP address as the absolute time information. The ATIP address usually consists of 24-bit data, and the upper eight (8) bits indicates "minute", following eight (8) bits indicates "second" and the lower eight (8) bits indicates "frame".

The number of frames for one (1) second is "75". Here, a recording area (hereinafter, referred to as "one (1) ATIP section", "first recording area") set by an ATIP address corresponding to "1/75" second is one (1) sector handled as the unit for recording/reading out in the optical disk apparatus 100. The recording area for this one (1) sector usually consists of 2 k bytes and, as described above, the synch pattern, the identifier, wobbling information, CRC data etc. are recorded in the recording area.

High-Density Recording Mode

Figure 3:
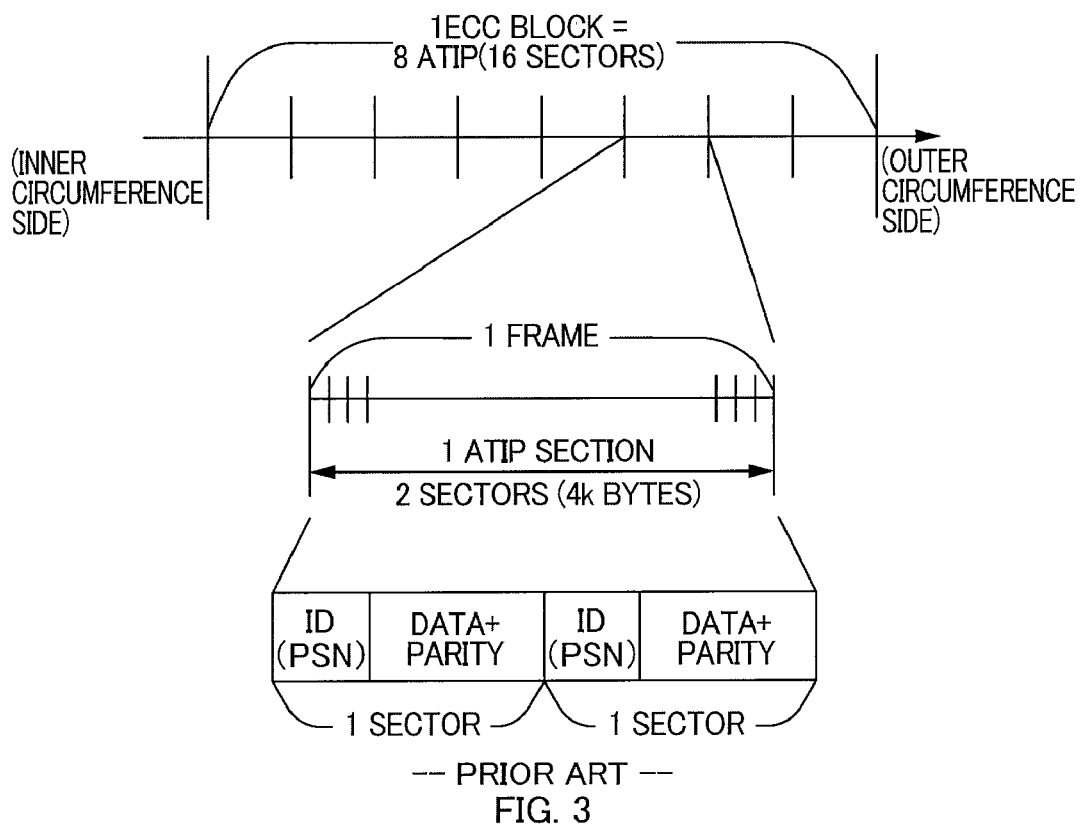
FIG. 3 illustrates a logical format employed for the case of a high-density recording mode.

Next, referring to FIG. 3, the logical format employed for the case of the high-density recording mode will be described. In the high-density recording mode, for example, it is provided that a recording density twice as high as that of the standard recording mode should be realized. Therefore, according to the logical format employed for the high-density recording mode, data for two (2) sectors, i.e., data of 4 k bytes is recorded in the above-described one (1) ATIP section. In a recording area for one (1) sector, as shown in the figure, the ID information, the recording data and the parity bit are recorded.

In the case of the high-density recording mode, since a modulation/demodulation scheme conforming to the DVD standard is employed, recording/reading out in units of ECC (Error Correction Code) block being the unit for executing error correction with the Reed Solomon Code are executed. It is provided that one (1) ECC block is for data of 16 sectors (32 k bytes) and, for example, the data is recorded in a recording area corresponding to eight (8) ATIP sections.

Physical Format of the High-Density Recording Mode

Next, the physical format of the optical disk 200 employed for the case of high-density recording mode will be described.

Figure 4:
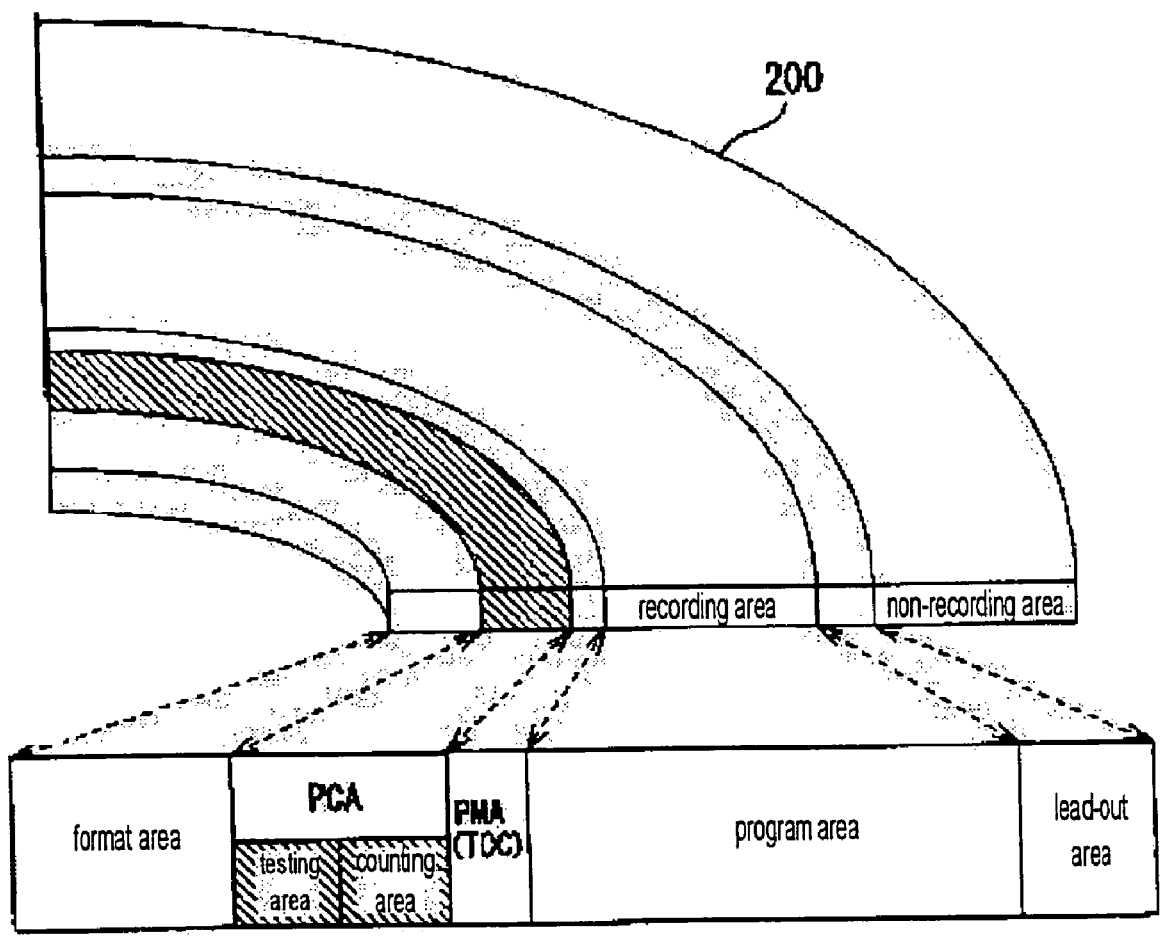
FIG. 4 illustrates a physical format of an optical disk employed for case of the high-density recording mode.

The physical format of the optical disk 200 has a composition, for example, shown in FIG. 4. As shown in the figure, a format area, a PCA (Power Calibration Area), a PMA (Program Memory Area), a TOC (Table Of Contents) area, a program area and a lead-out area are provided to the optical disk 200 from the inner circumference toward the outer circumference.

In the format area, a predetermined data (for example, all "0") is recorded when a format process of the optical disk 200 is executed in the high-density recording mode.

Figure 5:
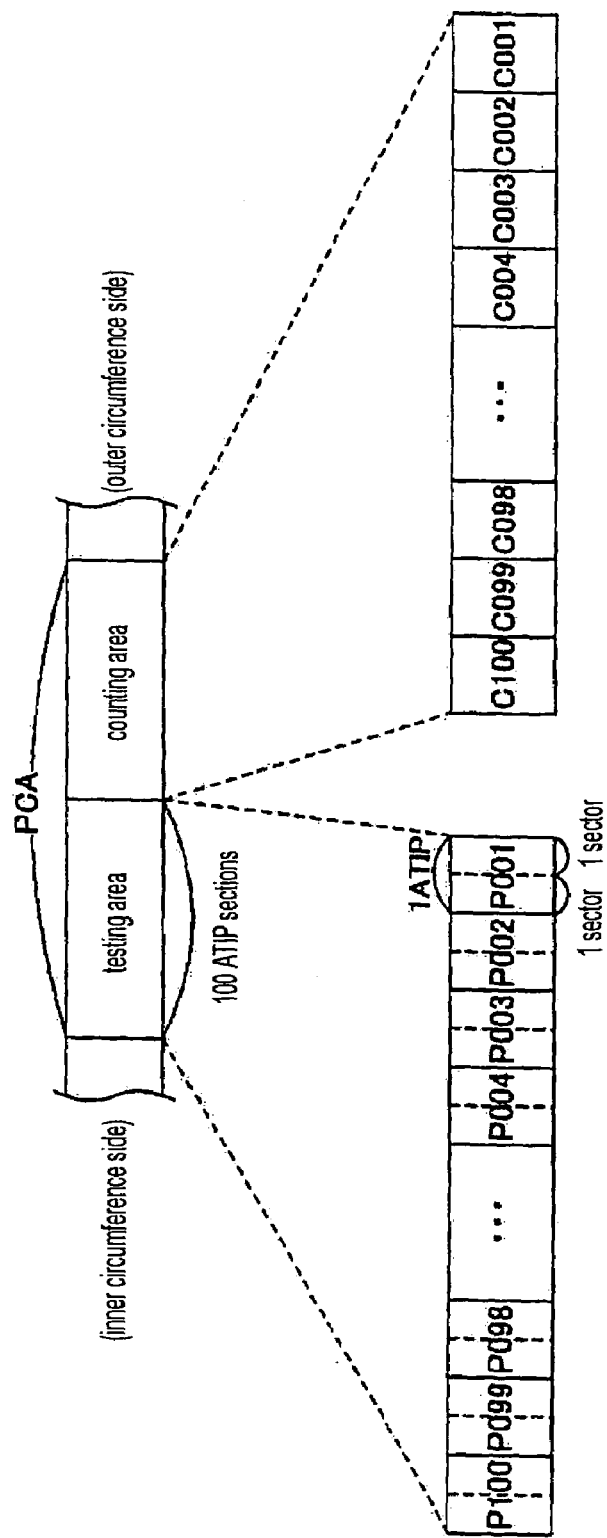
FIG. 5 illustrates a detailed physical format of a PCA.

The PCA is a recording area reserved, prior to the real recording, for setting the optimal recording power of the laser element 1a according to the recording velocity and the disk type of the optical disk 200. As shown FIG. 5, the PCA is segmented into a testing area and a counting area.

The testing area ("second recording area") is an area for recording actually a predetermined testing signal and is segmented into 100 partitions (P001-P100). This testing area corresponds to 100 ATIP sections.

On the other hand, the counting area forms 100 partitions (C001-C100) and, in each partition, the ATIP address or the ID information (PSN address) about the partition of the corresponding testing area and a flag value indicating recorded/non-recorded state of the testing signal are stored.

In the PMA, recording data during recording to the program area and the track information such as start and end addresses of the recording track are recorded in the same format as that of TOC information. The PMA may be used concurrently as the TOC area.

The program area is an area for recording and reading out of the actual data as an area available for users. A lead-out area is an area for identifying the ending positions of recording and reading out on the optical disk 200.

By the composition described above, the physical format employed for the case of high-density recording mode enables high-density recording by the concurrent use of the PMA and the TOC areas and omission of the pre-gap area compared to the physical format conforming to the existing CD standards.

Relationship between the ATIP Address and the PSN Address

ATIP Address

ATIP address will be described in detail.

Figure 6:
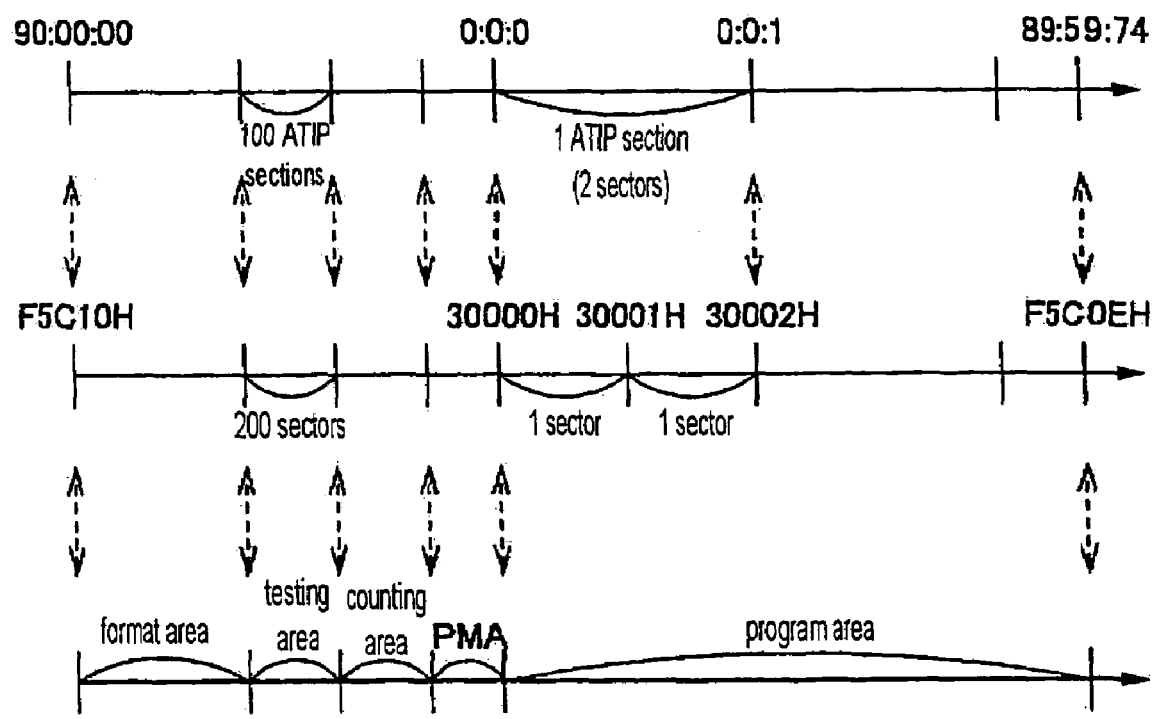
FIG. 6 illustrates the relationship between an ATIP address and a PSN address.

FIG. 6 shows setting information of the ATIP address obtained by decoding the physical wobbling information of the pre-groove of the optical disk 200 by the optical disk apparatus 100. This ATIP address has an aspect to be a physical address given to the recording track of the optical disk 200 and another aspect to be a logic address used by the optical disk apparatus 100 to control recording to or reading out from the optical disk 200.

ATIP address (hereinafter, referred to as "first reference ATIP address") corresponding to the innermost circumference of the program area is "00 (minute):00 (second):00 (frame)". Then, in the recording area (hereinafter, referred to as "outer circumference side recording area") in this program area from innermost circumference side toward the outer circumference side, an ATIP address obtained by simply increasing a first reference ATIP address respectively by one (1) frame based on the conversion of "one (1) second=75 frames" is given. In the invention, the maximum of the ATIP address on the outer circumference side recording area is defined as "89 (minute):59 (second):74 (frames)".

On the other hand, a recording area (hereinafter, referred to as "inner circumference side recording area") on the inner side than the first reference address is a reserved area not available for users such as a PCA and a PMA. This inner circumference side recording area is also given with an ATIP address. In the invention, for example, the minimum (hereinafter, referred to as "second reference ATIP address") of the ATIP address in the inner circumference side recording area is defined as "90 (minutes):00 (second):00 (frame)". Then, in the inner circumference side recording area, similarly to the outer circumference side recording area, an ATIP address obtained by simply increasing the second reference ATIP address respectively by one (1) frame based on the conversion of "one (1) second=75 frames" is given.

PSN Address

The PSN address will be described in detail.

FIG. 6 shows setting information of the PSN address used as the logic address for the case where the optical disk apparatus 100 executes recording to or reading out from the optical disk 200 in the high-density recording mode.

Here, PSN address means an address for high-density recording (y) calculated according to "y=n×(x−m)+m" where an absolute address as the ATIP address is "x". Here, "n" is a multiplying factor for the recording density (the multiplying factor for the standard recording mode is one (1)) and "n=2.0" if the recording density is 2.0 times as high as the standard density, and "m" is a reference address.

That is, the PSN address is given to a logically segmented area in one (1) ATIP section according to the logic format of the high-density recording mode, in which format a recording area (one (1) ATIP section) corresponding to unit time ("1/75" second) based on the absolute address is segmented by the multiplying factor of the recording density. Data n times as much is recorded in one (1) ATIP section by the recording in the high-density recording mode using this PSN address and, consequently, the recording density on the optical disk 200 is n times as much.

In the present embodiment, the multiplying factor of the recording density (n) is defined as "2" and the PSN address (m) on the innermost circumference side of the program area is defined as "30,000H (Hexadecimal)". In this case, the PSN address (y) correlated with the ATIP address of the outermost side recording area is calculated as "y=2×(x (hexadecimal)−30000H)+30000H". For example, the PSN address corresponding to the ATIP address of "00 (minute):00 (second):01 (frame)" is "30002H=2×(30001H−30000H)+30000H".

As described above, the ATIP address and the PSN address are correlated with each other and the optical disk apparatus 100 can use not only the PSN address but also the ATIP address in controlling an access to the optical disk 200 in the high-density recording mode.

The Operation of System-Controlling Microcomputer

Figure 7:
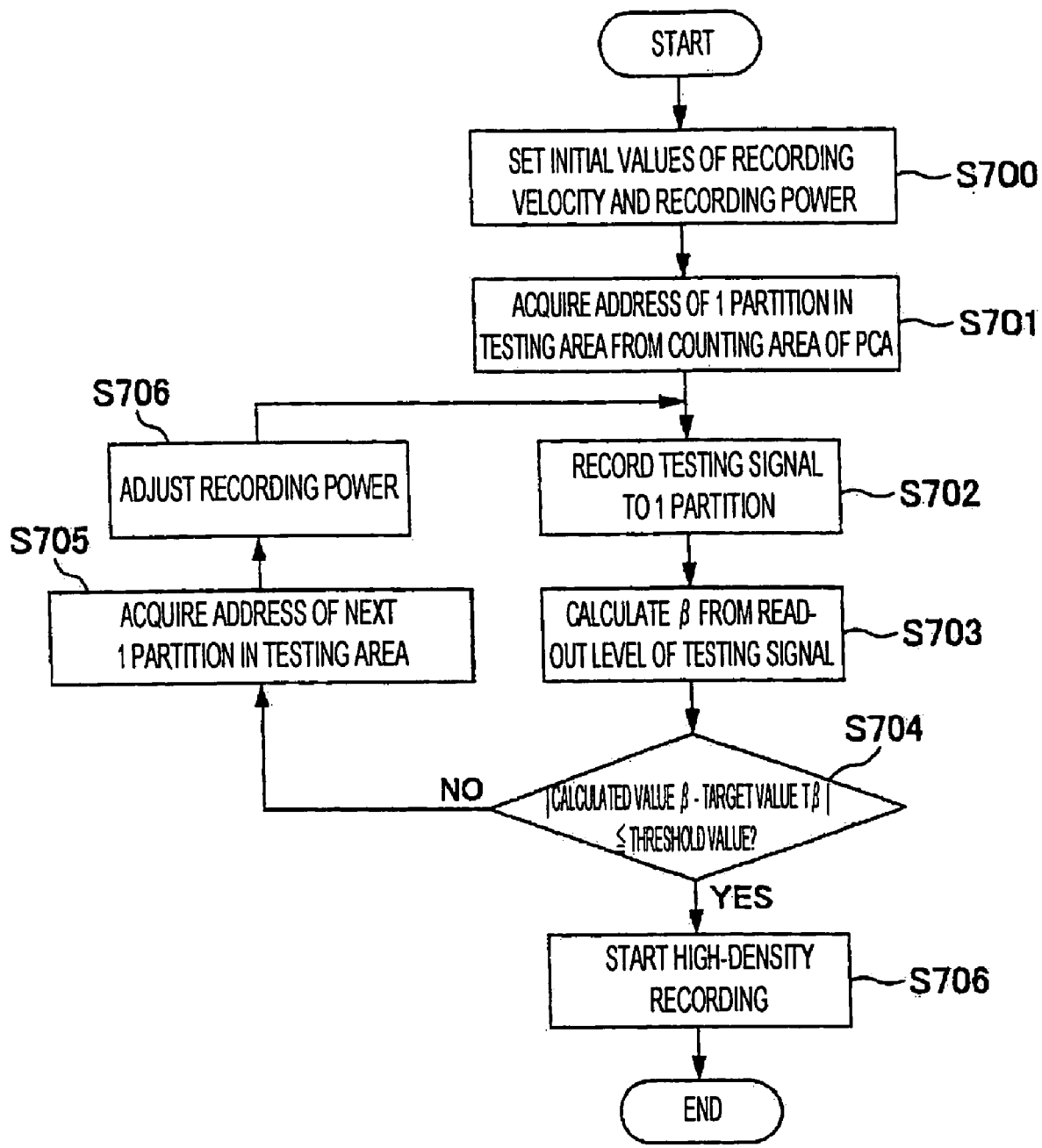
FIG. 7 is a flowchart illustrating the operation of a system-controlling microcomputer according to the embodiment of the invention.

Now, the operation of the system-controlling microcomputer 13 handling the characteristic processes in the present embodiment will be described referring to a flowchart shown in FIG. 7. In the following description, the system-controlling microcomputer 13 executes the processes when not remarked especially.

First, the optical disk apparatus 100 receives a recording request command in the high-density recording mode from an information processing apparatus such as a personal computer through the interface unit 11. Here, the optical disk apparatus 100 executes an OPC prior to the high-density recording to the optical disk 200.

Here, the system-controlling microcomputer 13 controls driving of the spindle motor 16 through the motor controlling circuit 18 to make the rotation velocity of the optical disk 200 be the initial value set in advance during the execution of the OPC. Similarly, the system-controlling microcomputer 13 drives the laser illumination of the laser element 1a through the laser output controlling circuit 14 to make the recording power of the laser beam emitted from the laser element 1a be the initial value set in advance (S700).

Next, the system-controlling microcomputer 13 obtains the ATIP address and the flag value read out from each of the partitions of the counting area of the PCA through the optical head 1 etc. (S701) and searches for one (1) partition of the testing area of the PCA where the testing signal is in the non-recorded state. Consequently, the system-controlling microcomputer 13 drives the laser illumination of the laser element 1 a through the laser output controlling circuit 14 to record the testing signal to the searched one (1) partition of the testing area of the PCA under the initially set conditions in S700 (S702). For the recording of the testing signal, since there is almost no need to consider the reliability, the encoding process such as formation of one (1) FCC block by addition of the Reed Solomon Code and the EFM-Plus modulation process is not executed by stopping the operation or annulling the output of the high-density recording mode encoder 10 etc.

Then, after recording of the testing signal to one (1) partition of the testing area of the PCA has been executed, reading-out of the testing signal recorded from the one (1) partition is executed. In this case, the system-controlling microcomputer 13 receives the peak level A1 and the bottom level A2 of the read-out signal of the testing signal through the reading-out level detection circuit 4 and calculates the asymmetry value $\beta$ (S703). For the reading out of the testing signal, for the same reason as that of the above described recording, the encoding process such as the EFM-Plus modulation process and error correction by the Reed Solomon Code is not executed by stopping the operation or annulling the output of the high-density recording mode decoder 9 etc.

Next, the system-controlling microcomputer 13 executes determination of the optimum of the OPC by comparing the target T$\beta$ read out from the ROM 19 with the asymmetry value $\beta$ calculated in S703. The determination of the optimum is executed by, for example, determining whether the absolute value of the finite difference between the asymmetry value $\beta$ calculated in S703 and the target T$\beta$ is below a predetermined threshold value or not (S704).

Here, when the above-described absolute value is larger than the predetermined threshold value (S704: NO), because of a need for executing again the adjustment of the recording power of the laser element 1*a* as well as the determination of the optimum of the OPC, the system-controlling microcomputer 13 updates the flag value in the counting area of the PCA searched in S702 and, concurrently, obtains the ATIP address in the testing area of the next PCA (S705). Furthermore, the microcomputer 13 executes adjustment of the recording power of the laser element 1*a* by the amount corresponding to the above-described absolute value (S706) and executes again S702 and the steps following it.

On the other hand, when the above-described absolute value is below the predetermined threshold value (S704: YES), the system-controlling microcomputer 13 sets the recording power of the current laser element 1*a* as the optimal recording power and controls the operation of the high-density recording mode encoder 10 etc. to start the execution of the high-density recording based on the recording request command received from the information processing apparatus (S706).

As described above, the optical disk apparatus 100 and the method for controlling it according to the invention do not make accesses in units of ECC blocks being the unit for executing error correction like a conventional optical disk apparatus for the testing area of the PCA used for the OPC but controls accesses for respective one (1) ATIP section (one (1) partition) constituting the testing area. There is no need to improve the reliability of the testing signal recorded to and read out from the testing area of the PCA, that is, since there is no need to make accesses in units of ECC block, data processes such as error correction by the Reed Solomon Code and EFM+Plus (8/16) modulation/demodulation during access control for the above-described respective one (1) ATIP section are not executed.

This results in improvement of the frequency of accesses to the testing area of the PCA compared with the access control in units of block and, therefore, effective use of the testing area can be facilitated. Furthermore, due to the improvement of the frequency of accesses to the testing area of the PCA, the number of times of recording and re-recording of data to the program area (area available for users) is increased and effective use of the program area can be facilitated by the amount of the increase.

As described above, the embodiment of the invention has been described in detail. However, the present invention is not limited to the embodiment and various changes can be made without departing from the scope of the invention.

For example, in the above-described example, recording and reading out of the testing signal are executed for respective one (1) ATIP section (partition) in the testing area of the PCA. However, the optical disk apparatus 100 according to the invention can execute recording for respective one (1) sector ("segmented area") obtained by logically segmenting one (1) ATIP section in the high-density recording mode. Then, in the OPC, recording and reading out of the testing signal may be executed for respective one (1) sector obtained by logically segmenting one (1) ATIP section. In this case, for the counting area of the PCA, the same number of partitions as the sectors constituting the testing area of the PCA are formed, and the ID information or the PSN address given to the corresponding sector is stored in each of the partitions. Then, in the case where searches as well as accesses are made to the sectors to which the testing signal is recorded in the testing area of the PCA, the ID information and the PSN address stored in each of the partitions of the counting area of the above-described PCA are obtained.

As described above, the optical disk apparatus 100 and the method for controlling it according to the invention executes recording and reading out of the testing signal for respective one (1) sector obtained by logically segmenting the testing area of the PCA. Thereby, the frequency of accesses to the testing area of the PCA is further improved and, therefore, effective use of the testing area can be facilitated.

Furthermore, in the above-described example, the testing area of the PCA is taken as an example and described. However, the invention provides an effective control approach for other areas for which there is no need to make accesses in units of ECC block and there is no need to execute any data processes for improving the reliability such as the error correction by the Reed Solomon Code and the EFM-Plus (8/16) modulation/demodulation. As the other areas, for example, the PMA in which recording data during recording etc. are temporarily stored, etc. are considered.

That is, the optical disk apparatus 100 and the method for controlling it according to the invention executes access control one by one to respective one (1) ATIP section or to each respective sector obtained by logically segmenting one (1) ATIP section not only for the testing area of the PCA but also for the recording area under the above-described conditions without applying any data modulation and demodulation process. Thereby, it is possible to improve the frequency of accesses to the recording area under the above-described conditions and, therefore, effective use of the recording area can be facilitated.

Furthermore, in the above example, the optical disk apparatus 100 may be an optical disk read-out apparatus dedicated to reading out in the high-density recording mode. In this case, since no mechanism for data modulation processing is equipped, access control is executed one by one to respective one (1) ATIP section or to each respective sector obtained by logically segmenting one (1) ATIP section without applying any data demodulation process.

According to the invention, an optical disk apparatus capable of facilitating effective use of the recording area of an optical disk, and a method for controlling it can be provided.

Although the preferred embodiment of the present invention has been described in detail, it should be understood that various changes, substitutions and alterations can be made therein without-departing from spirit and scope of the inventions as defined by the appended claims.

What is claimed is:

1. A method comprising:
    receiving a request to record a block of data in a program region of an optical disk, the optical disk comprising a recording track that is divisible into segments and that includes a testing region and the program region, each segment being sized to correlate with a wobble of the recording track, and the block being sized to correlate with a unit for executing error correction;
    recording, based on receiving the request, a testing signal within a segment-sized partition of the testing region without encoding the testing signal;
    accessing the recorded testing signal without decoding the testing signal; and
    determining an optimum power control value based on accessing the recorded testing signal.

2. The method of claim 1, wherein the partition is smaller than the block.

3. The method of claim 1,
    wherein the segment is an Absolute Time In Pregroove (ATIP) segment, and
    wherein the wobble is an ATIP wobble.

4. The method of claim 1, wherein the block is sized to correlate with an Error Correction Code (ECC) block.

5. The method of claim 1, wherein request to record the data further comprises a request to record the data in a logical format of a high-density recording mode that is higher in recording density than a standard recording mode.

6. The method of claim 1,
    wherein the optical disk is a compact disc, and
    wherein the request to record the data further comprises a request to record the data in a digital versatile disk (DVD) format.

7. The method of claim 1, further comprising logically segmenting the recording track into segments.

8. The method of claim 1,
    wherein the recording track further includes a counting region, and
    wherein the counting region and the testing region comprise a power calibration area of the optical disk.

9. The method of claim 1,
    wherein the segment comprises a 4 kilobyte segment, and
    wherein the block comprises a 32 kilobyte segment.

10. The method of claim 1, wherein the testing area is divisible into 100 segment-sized partitions.

11. The method of claim 1, further comprising recording the block of data in the program region based on determining the optimum power control value.

12. A device comprising:
    an interface unit configured to receive a request to record a block of data in a program region of an optical disk, the optical disk comprising a recording track that is divisible into segments and that includes a testing region and the program region, each segment being sized to correlate with a wobble of the recording track, and the block being sized to correlate with a unit for executing error correction;
    a laser output controlling circuit configured to record, based on receiving the request, a testing signal within a segment-sized partition of the testing region without encoding the testing signal; and
    a processor configured to:
        access the recorded testing signal without decoding the testing signal, and
        determine an optimum power control based on accessing the recorded testing signal.

13. A computer program product, tangibly embodied in a machine-readable medium, the computer program product comprising instructions that, when read by a machine, operate to cause a data processing apparatus to:
    receive a request to record a block of data in a program region of an optical disk, the optical disk comprising a recording track that is divisible into segments and that includes a testing region and the program region, each segment being sized to correlate with a wobble of the recording track, and the block being sized to correlate with a unit for executing error correction;
    record, based on receiving the request, a testing signal within a segment-sized partition of the testing region without encoding the testing signal;
    access the recorded testing signal without decoding the testing signal; and
    determine an optimum power control based on accessing the recorded testing signal.

* * * * *